(12) United States Patent
Franke et al.

(10) Patent No.: US 7,012,980 B2
(45) Date of Patent: Mar. 14, 2006

(54) SYNCHRONOUS, CLOCKED COMMUNICATION SYSTEM WITH RELATIVE CLOCK AND METHOD FOR CONFIGURING SUCH A SYSTEM

(75) Inventors: Michael Franke, Erlangen (DE); Alexander Heider, Erlangen (DE); Martin Kiesel, Poxdorf (DE)

(73) Assignee: Siemens Aktiengesellschaft, Munich (DE)

( * ) Notice: Subject to any disclaimer, the term of this patent is extended or adjusted under 35 U.S.C. 154(b) by 877 days.

(21) Appl. No.: 09/950,152

(22) Filed: Sep. 10, 2001

(65) Prior Publication Data

US 2002/0131540 A1    Sep. 19, 2002

(30) Foreign Application Priority Data

Mar. 16, 2001  (DE) ................................ 101 13 260

(51) Int. Cl.
    *H04L 7/00*        (2006.01)
(52) U.S. Cl. ......................... 375/356; 375/354
(58) Field of Classification Search ................ 375/254, 375/354, 356; 370/508; 700/79–82; 709/200, 709/201, 223–224, 245, 247, 400; 710/58; 713/400

See application file for complete search history.

(56) References Cited

U.S. PATENT DOCUMENTS

| | | | | |
|---|---|---|---|---|
| 4,939,753 A | * | 7/1990 | Olson ......................... | 375/356 |
| 5,142,470 A | * | 8/1992 | Bristow et al. ................ | 700/79 |
| 5,475,717 A | * | 12/1995 | Cordonnier et al. ......... | 375/356 |
| 6,047,222 A | * | 4/2000 | Burns et al. .................... | 700/79 |
| 6,564,242 B1 | * | 5/2003 | Bonet et al. ................. | 709/201 |
| 6,826,590 B1 | * | 11/2004 | Glanzer et al. .............. | 709/200 |

FOREIGN PATENT DOCUMENTS

| | | |
|---|---|---|
| DE | 10004425 | 1/2002 |
| EP | 0548381 | 12/1991 |
| EP | 0840185 | 10/1997 |
| WO | 9814851 | 4/1998 |

OTHER PUBLICATIONS

IEC 61491, EN 61491, SERCOS Interface Technische Kurzbeschreibung.
"Innovtionen beim PROFIBUS" by Max Felser, STZ, Apr. 2000.

* cited by examiner

*Primary Examiner*—Emmanuel Bayard
*Assistant Examiner*—Lawrence B. Williams
(74) *Attorney, Agent, or Firm*—Baker Botts L.L.P.

(57) ABSTRACT

The invention relates to a synchronous, clocked communication system, for example a distributed automation system, the stations of which can be arbitrary automation components which are coupled to one another via a data network (1) for the purpose of mutual data exchange. In this arrangement, all possible bus systems such as, e.g. field bus, professional field bus, Ethernet, industrial Ethernet etc. are available for use as the data network (1) of the communication system. One station of this communication system is designated as timing generator and ensures the distribution and maintenance of the communication clock used to and by all stations. The timing generator can also introduce a relative clock (9) in the entire communication system at all stations via the same mechanism. This station is thus also the master of the relative clock (9) or the applicable relative time (16). All stations of the communication system are, therefore, continuously synchronized to the relative clock (9), which is applicable throughout this system, with the valid relative time (16) and, therefore have the same understanding of time at any time. This distinctly improves or even makes possible, respectively, the implementation of applicative sequences, synchronization of events occurring simultaneously, accuracy in time during the detection of events or, respectively, switching of outputs.

32 Claims, 2 Drawing Sheets

SYNCHRONOUS, CLOCKED COMMUNICATION SYSTEM WITH RELATIVE CLOCK AND METHOD FOR CONFIGURING SUCH A SYSTEM

FIELD OF THE INVENTION

The invention relates to a synchronous, clocked communication system with relative clock and a method for configuring such a system.

BACKGROUND OF THE INVENTION

A synchronous, clocked communication system having characteristics of equidistance is understood to be a system of at least two stations which are connected to one another via a data network for the purpose of the mutual exchange of data or, the mutual transmission of data. In this arrangement, the data exchange is cyclic in equidistant communication cycles which are predetermined by the communication clock used by the system. Stations are, for example: centralized programmable controllers; programming, configuration or operating devices; peripheral devices such as e.g., input/output modules, drives, actuators, sensors, stored-program controllers (SPS) or other control units, computers or machines which exchange electronic data with other machines, particularly those which process data of other machines. In the text which follows, the control units are understood to be closed-loop or open-loop control units of any type. The data networks used are, for example, bus systems such as, field bus, professional field bus, Ethernet, industrial Ethernet, FireWire or internal PC bus systems (PCI) etc.

In distributed automation systems, for example in the field of drive engineering, clocked data networks or bus systems are often used. Some of the connected stations are used as master devices, e.g. control units such as numeric or stored-program controllers or configuration devices, and other stations are used as slave devices such as drives or peripheral devices. Automation components of both categories can operate in a clocked manner, i.e., these stations can synchronize to a communication clock used in the data network. This means that the communication clock can be taken over by the stations via the data network used and certain processes can be controlled in synchronism with this communication clock. According to IEC 61491, EN61491 SER-COS interface—Technische Kurzbeschreibung (basic technical description) (http://www.sercos.de/deutsch/doku_freier_bereich.htm), this is currently used and carried out in distributed automation systems. However, it is not possible at present to introduce a relative clock which is valid for such a system, and to the respective valid relative time of which all stations connected to the communication system can be synchronized. As a result, for example, applicative event sequences cannot be specified and carried out, or at least not with sufficiently great accuracy in time.

SUMMARY OF THE INVENTION

It is the object of the present invention to provide a synchronous, clocked communication system having characteristics of equidistance and a relative clock between at least two stations and a data network and a method for introducing a relative clock into such a communication system, in which all stations connected to the communication system can synchronize to this relative clock.

This object is achieved by a synchronous, clocked communication system and method for configuring a synchronous, clocked communication system having characteristics of equidistance in the field of industrial systems between at least two stations, especially automation components, and at least one data network. In particular, during start-up of the communication system, an unambiguous relative clock integrated throughout the system is introduced and a subset of all stations connected to the data network are synchronized at least once to the relative time determined by the relative clock, with the relative time being transmitted to all stations via the data network.

The present invention is based on the finding that when a clocked bus system or data network is used in distributed automation systems, the beginning of each new communication cycle is indicated to all stations of the communication system, for example by transmitting a special data packet, e.g. a so-called global control data packet. Apart from this method, there are also other methods which provide for clock synchronization between the stations which, naturally, can also be used in conjunction with the present invention disclosed herein. Together with the information on the length of a communication clock cycle which is determined at least during start-up of the system and is distributed to all stations, all stations can be synchronized to the clock. This information is transmitted to all stations of the communication system by a distinguished master station, the so-called timing generator. If this timing generator additionally exhibits a relative clock, the respective current relative time can be distributed to all connected stations on the same transmission path as a result of which the same relative time applies to all stations connected.

A preferred embodiment of the present invention comprises at least one control unit, at least one unit to be controlled, and at least one decentralized input/output module which, as interface between the data network and the unit to be controlled, bidirectionally exchanges signals between the unit to be controlled and the control unit by means of the data network, and are connected to the data network as stations of the communication system. The control unit, for example, may be used as timing generator. The term "unit" means, in particular, automation components, machines, drives etc. The term "device" is used synonymously to the term "unit".

In a further preferred embodiment of the present invention, the unambiguous relative time introduced throughout the system by the relative clock is composed of two parts. The first part characterizes the current communication cycle, and the second part determines the time within the current communication cycle of the communication system. The advantage of this embodiment is that any communication cycle (and in addition any time within any communication cycle) can be precisely determined. This means that the accuracy in time during the detection and registration and during the switching of events, or in any open-loop and closed-loop processes is extraordinarily improved.

Further preferred embodiment are discussed herein below, the first of which is characterized by the fact that the communication cycle is represented by a digitized number, or an absolute time unit which is derived from the duration of the communication clock cycle. The accuracy of the relative clock is adjustable within a range between the duration of one communication clock cycle and 1 $\mu$s. By their means, it is possible to select the optimum form of representation for the respective situation, thus, for example in arranging events in time, it is more advantageous to select an absolute time representation than an abstract representation because it is clearer.

The next preferred embodiment of the invention is characterized by the fact that the unambiguous relative clock applicable throughout the system (and thus the relative time) remains valid for all stations until the system is shut down, and all stations remain synchronized to the unambiguous relative clock applicable throughout the system, and thus synchronized to the relative time, until the system is shut down. This ensures that the same relative time applies to all stations during the running time of the system, and the simultaneity of events is ensured within the framework of the predetermined temporal resolution of the relative time. This considerably reduces the influence of station-related dead times.

The next preferred embodiment of the invention is characterized by the fact that the duration of the communication clock cycle is adjustable and is specified at least once during the system start-up. Further, the duration of a communication clock cycle can be between 10 $\mu$s and 10 ms. This makes it possible to optimally specify the length of a communication clock cycle for each specific application, particularly each individual configuration of the communication system considered.

The next preferred embodiment of the invention is characterized by the fact that signals of a device to be controlled, when they are registered and detected at the input of a decentralized input/output module, are provided by the input/output module with a stamp which is composed of the relative time which is current at this time and the detection switching event, are converted into a data format compatible for the data network. The data are forwarded with this stamp via the data network to the control unit where they are evaluated and processed. The relative time, as part of the stamp, consists of two parts, one part determining the communication cycle of the communication system in which the registration and signal detection has taken place, and the other part determining the time relative to the start or to the end of the communication cycle of the communication system in which the registration and signal detection has taken place. As a result, the detection time of events, for example of a device to be controlled, can be determined with extraordinary precision and stored and is thus available at any time for the calculation of dependent events.

The next preferred embodiment of the invention is characterized by the fact that data which are intended for the device to be controlled, before they are transmitted to the decentralized input/output module, are provided by the control unit with a stamp which is composed of a relative time referenced to the time of the planned signal output and an output switching event. The data with this stamp are transmitted to the input/output module via the data network, the relative time, as part of the stamp, consisting of two parts, one part determining the communication cycle of the communication system in which the signal output is to take place and the other part determining the time relative to the start or to the end of the communication cycle of the communication system in which the signal output is to take place. The data which are provided with such a stamp relates to the planned signal output and are intended for the device to be controlled are converted by the decentralized input/output module into signals which can be interpreted for the device to be controlled and are switched in accordance with the predetermined switching event at the output of the decentralized input/output module at the time which is predetermined by the transmitted stamp and are output to the device to be controlled. This embodiment is of particular advantage in that the switching of an output event at the output of the decentralized input/output module can be planned precisely and carried out with extraordinary precision depending on the time of registration of an entry event at the input of a decentralized input/output module. This is extraordinarily advantageous in the field of drive engineering in distributed automation systems, for example in the case of wood-processing machines, or for the switching of cams etc. The time interval between input event and output event is thus individually adjustable and achievable in each case with the same high accuracy in time for any situation in the field of application described, hence the dependence on dead times of affected stations in the communication system is also greatly reduced. Thus, an isochronous data exchange or, control of events, or event sequences within the communication system between the stations can be made possible, or considerably improved on the basis of these embodiments.

A further preferred embodiment of the present invention is characterized by the fact that the switching and forwarding of signals to a device to be controlled takes place at the output of a decentralized input/output module in defined dependence, which is adjustable in time, relative to the time of registration and detection of signals of a device to be controlled at the input of a decentralized input/output module. The particular advantage of this form lies in that, as a result, applicative event sequences can be implemented which, in particular, are of eminent significance especially in the case of wood-processing machines, for example in the production of furniture boards. Thus, units for applying or cutting off edge bands must be switched with high precision of timing, for example, in dependence on the detection of front or rear edges of wood.

Yet another preferred embodiment of the invention is characterized by the fact that data, which are stored by one or more stations of the communication system until the system is shut down, are stored together with the respective current relative time of the system. The joint evaluation and/or representation of the data thus recorded takes place on the basis of the respective stored relative time of the system. As a result, trace drawings distributed to different stations can be extremely easily combined and evaluated for a real-time trace on the basis of the uniform relative time. It is thus possible in a very simple manner to obtain information on, for example, the response characteristics of the stations from which, for example, conclusions can be drawn on any impending failures of individual automation components.

A further preferred embodiment of the invention is characterized by the fact that one or more stations of the communication system, especially automation components which support the relative clock, provide characteristic data which can be called up and evaluated by at least one control unit via the data network. The characteristic data contains at least the support of the relative clock and/or the possible adjustable accuracy and/or at least one possibility for adjusting the relative clock and/or the support of at least one mechanism which is derived from the use of a relative clock in a communication system. The advantage here is that characteristic data can be read out on-line as device descriptions both during active operation from the corresponding station or stations. The automation component or components, can be provided off-line as description information, as a result of which the range of said characteristics provided, especially the support of the derived mechanisms such as e.g. accurate detection of switching events, accurate switching of the actuators etc. is accurately documented and thus the range of use of the corresponding station is delimited most precisely.

A further preferred embodiment of the invention is characterized by the fact that one or more stations of the communication system, especially automation components, can perform the detection of events only within certain operating phases, and/or at particular times on the basis of the relative clock. This is important because, the detection of events on the basis of the relative clock by the corresponding automation components is only possible at the relevant and necessary times as a result of which unnecessary detections, and thus the production of superfluous volumes of data, are avoided. This can be implemented, for example, via enable/disable mechanisms via the data network, for example originating from a control unit or via external circuitry at the automation component.

It is preferred that the disclosed methods be applied or, respectively, used, especially with respect to the relative clock, with said applicative forms such as e.g. detection of switching events, precise switching of outputs, detection of internal actual states including associated timestamp, etc. to and in industrial machines such as, e.g. in packaging machines, presses, injection molding machines, textile machines, printing machines, machine tools, robots, handling systems, wood processing machines, glass processing machines, ceramic processing machines and lifting tools.

BRIEF DESCRIPTION OF THE DRAWINGS

In the text which follows, the invention will be described and explained in greater detail with reference to the illustrative embodiments shown in the figures, in which.

DETAILED DESCRIPTION OF THE INVENTION

Figure 1:
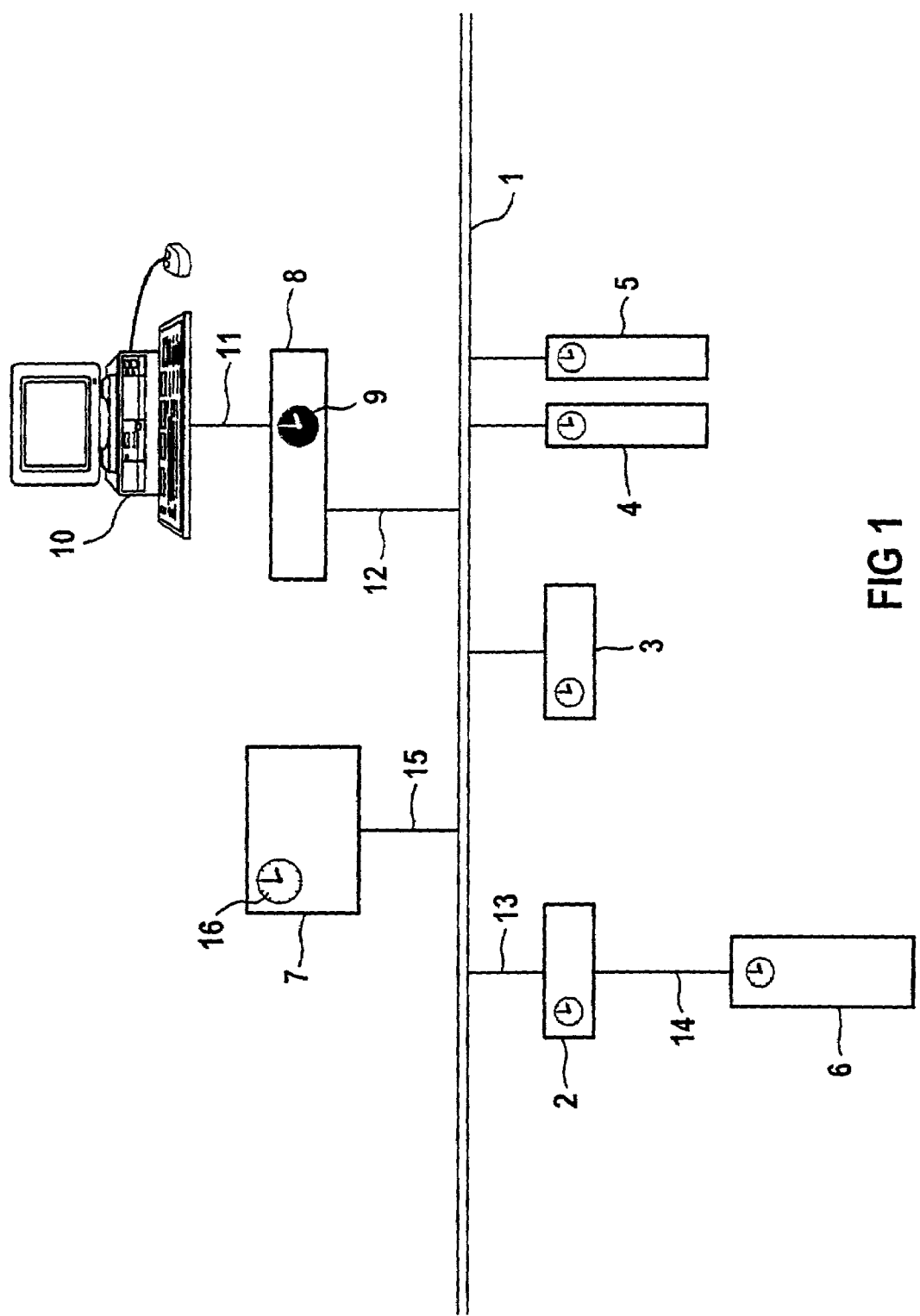
FIG. 1 shows a diagrammatic representation of an exemplary embodiment of a synchronous, clocked communication system with relative clock.

FIG. 1 shows a diagrammatic representation of an exemplary embodiment of a synchronous, clocked communication system with relative clock. The communication system shown is, at the same time, a distributed automation system. In the text which follows, these two terms will be used synonymously. The exemplary embodiment shown consists of a number of stations which can be formed both as transmitter and as receiver, at the same time, and thus can transmit and also receive both signals or data. All stations are connected directly or indirectly to the data network 1, for example by a bus system with and/or without real-time characteristics such as clock synchronization and equidistance such as, e.g. Ethernet, industrial Ethernet, field bus, professional field bus, FireWire or also internal PC bus systems (PCI) etc., but also clocked data networks such as, for example, isochronous real-time Ethernet, via data lines of which only data lines 11, 12, 13, 14 and 15 have been shown for reasons of clarity of representation. The data lines are formed depending on their intended use, in such a manner that they can transmit or conduct both data and signals or other electrical pulses. In particular, data lines of various types can be used in this distributed automation system which in each case can transmit data in different data formats. Thus, data can be sent in a different format via the data line 14 than, for example, via the data line 13. In this case, for example, the decentralized input/output module 2 takes care of the appropriate conversion. Naturally, it is also possible for the data lines 13 and 14 to transmit data in the same format. In this case, genuine data conversion by the decentralized input/output module 2 is not necessary. Instead the data are forwarded in unchanged form which corresponds to a so-called switching-through of the data. The possibility for the decentralized input/output module 2 to treat and/or process the data in any manner, especially to add a time stamp or something similar to the data without changing the data format itself, and/or converting it into another format if this is necessary for the proper functioning of the automation system, is unaffected. Data lines connected directly to the data network 1, such as data lines 12, 13 and 15, in principle transmit data in the same data format as the data network 1 itself. The data network 1 operates in a clocked manner and data are exchanged synchronously at the communication clock rate via the data network 1. Initial synchronization of all connected stations to the clock occurs, for example, during system start-up. To ensure a clocked data exchange, these stations are continuously resynchronized during the active operation. Naturally, it is also possible for stations which are connected to the data network 1 during active operation to be synchronized to the communication clock. The possibility of being able to adjust the communication clock at least once during system start-up depending on requirement and/or application is particularly advantageous. Experience has shown that it is particularly advantageous if the duration of a communication clock cycle is between 10 $\mu$s and 10 ms. In this exemplary embodiment, devices to be controlled are shown as stations, for example drives 4, 5 and 6, decentralized input/output modules 2, 3, configuration device 7, a control unit 8 which is constructed both as timing generator for the communication clock and as master of the relative clock 9 and is equipped with corresponding means, and an operating device 10 which in this case is constructed, for example, as computer with keyboard and mouse. Any other types of automation components or devices may also be configured as stations and the number and/or location of the stations are here only specified by way of example. All stations shown are synchronized to the relative time 16 predetermined by the relative clock 9. For reasons of clarity, the relative time 16 has only been designated at the configuration device 7. In the exemplary embodiment, an event can be performed at a device to be controlled, for example an actual-value detection, for example, of the analog drive 6, via a sensor and/or actuator integrated into this drive and not shown for reasons of clarity. These actual values can be transmitted by means of the data line 14 to the decentralized input/output module 2 where they are detected in clock-controlled synchronism and converted into a corresponding data format compatible with the data network 1. The data converted in this manner are then forwarded synchronously at the communication clock used in the communication system, via data line 13, data network 1 and data line 12 to the control unit 8. As shown, the control unit 8 is formed as a stored-program control (SPS) or any other open-loop or closed-loop control unit which receive and evaluate data, for example actual values, from all stations connected to the data network 1, and/or can send data, for example nominal values to all stations. Thus, the control unit 8, processes the actual values of the drive 6 sent in clockcontrolled synchronism by the decentralized input/output module 2, calculates corresponding nominal values on the basis of these actual values, and sends these nominal values (also in clock-controlled synchronism) via data line 12, data network 1 and data line 13 back to the decentralized input/output module 2. The latter converts the received nominal values into signals which can be interpreted for the drive 6 and forwards them synchronously at the communication clock used via data line 14 to drive 6 which interprets and converts the received nominal values, for example as control commands, by means of an integrated actuator, not shown for the sake of simplicity. This same mechanism can be analogously transferred to a process which is connected to the decentralized input/output module 3.

An operating device 10 may also be used to access the control unit 8 manually via the data line 11 and by this means influence the appropriate closed-loop and open-loop control mechanisms of the control unit 8. The configuration device 7 and the control unit 8 are constructed as master devices since they can exert direct influence on the control of the communication system and the other connected stations. Analogously, the other stations (drives 4, 5 and 6, and the decentralized input/output modules 2 and 3) are designated as slave devices since they are correspondingly driven by the master devices 7 and 8. In this arrangement, it is easily possible, as can be seen from the exemplary embodiment, that automation components such as drives 4 and 5 can also be connected directly to the data network 1 without any interposed decentralized input/output module. For reasons of simplicity of representation, the connection of other devices to be controlled to the decentralized input/output module 3 has not been shown. The drives 4, 5 and 6 shown must also be considered as examples of any automation components, especially field devices, devices or machines to be controlled.

The exemplary embodiment shown additionally exhibits a control unit 8 which, among other things, is constructed as timing generator for the communication/synchronization clock and as master of the relative clock 9. The relative clock 9 integrated in the control unit 8 can be implemented, for example, as hardware or as software. The relative clock 9 provides an unambiguous relative time 16 which is applicable throughout the system and which is composed of two parts, the first part characterizing the current communication cycle and the second part determining the time within the current communication cycle. As a result, any communication cycle, and moreover any time within any communication cycle, can be accurately determined which extraordinarily improves the accuracy in time during the detection and registration and, respectively, the switching of events or in any open-loop and closed-loop control processes. The accuracy of the relative clock 9 can be adjusted by the control unit 8 within a range of between the duration of one communication cycle and 1 $\mu$s depending on application. The relative time 16 can be represented by a digitized number or an absolute time unit which is derived from the duration of the communication clock cycle.

In the clocked communication system as shown in FIG. 1, the beginning of each new communication cycle may be directly indicated to all stations by the transmission of a special data packet such as, e.g., a global control data packet. Together with the information on the length of a communication clock cycle which is specified at least during system start-up and is distributed to all stations, all stations can synchronize to the clock used. This information is transmitted to all stations of the communication system by the control unit 8 as timing generator. This transmission mechanism is also used by the control unit 8 for distributing the current relative time 16 of the relative clock 9 to all connected stations. This unambiguous relative clock 9, which is applicable throughout the system, ensures that the relative time 16 therefore remains valid for all stations until the system is shut down. Moreover, the control unit 8 continuously ensures that all stations remain synchronized to this relative clock 9 (and relative time 16) until the system is shut down. This ensures that the same relative time 16 always applies to all stations during the running time of the system, as a result of which the simultaneity of events is ensured within the framework of the predetermined temporal resolution of the relative time 16. This considerably reduces the influence of station-related dead times.

Figure 2:
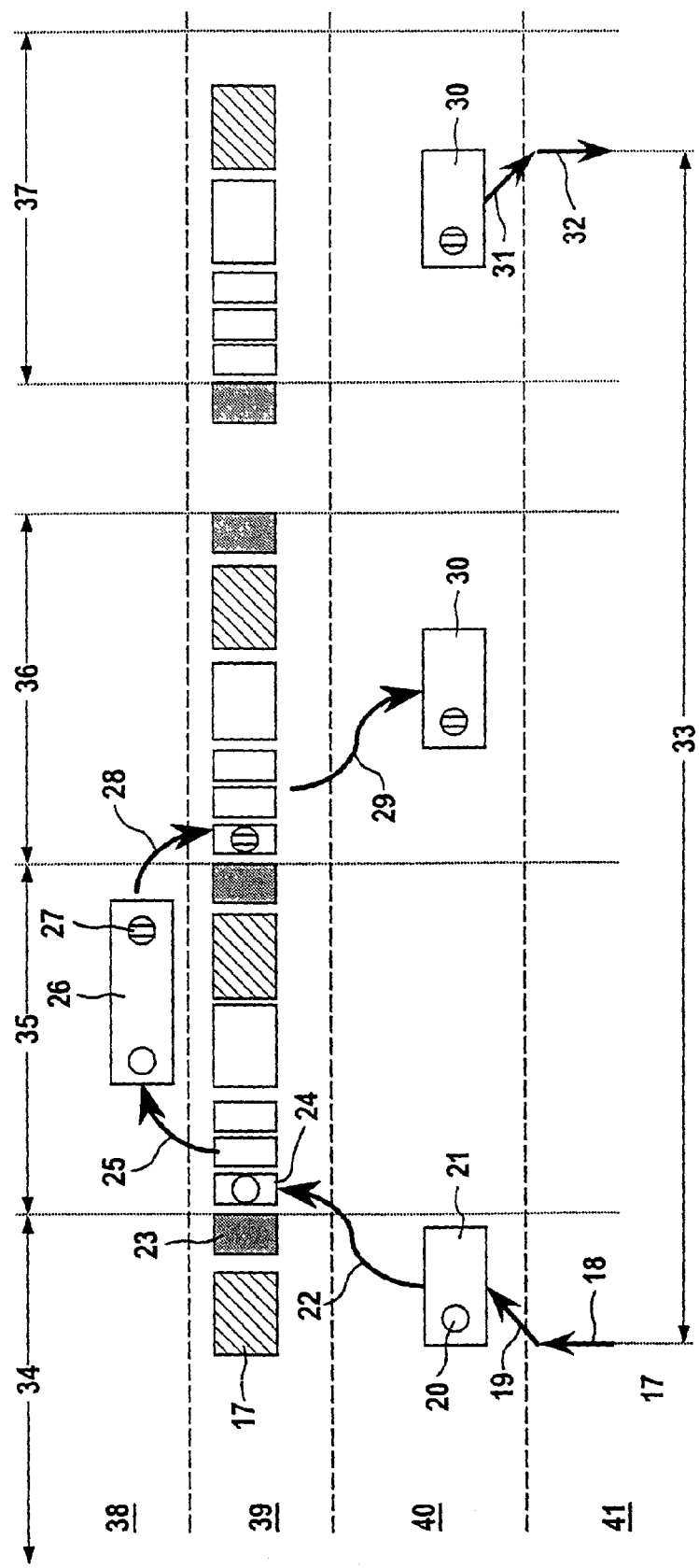
FIG. 2 shows the basic operation in a synchronous clock communication system with relative clock in the field of distributed automation systems, using a stamp.

FIG. 2 shows the basic operation of a synchronized clocked communication system with relative clock in the field of distributed automation systems, using a stamp. Three successive communication cycles, cycle m (34), cycle m+1 (35) and communication cycle m+2 (36) and a further communication cycle m+x (37), which occurs at a later time but does not follow immediately, are shown. Furthermore, the basic operation between the occurrence of an input event 18 and the corresponding output event 32 is subdivided into four levels, namely into a control unit level 38, a data network level 39, an automation component level 40 and a process interface level 41. All stations belonging to control unit level 38 must be called master devices, such as, e.g. control unit 8, whereas the automation component level 40 includes automation components such as, for example, the decentralized input/output modules 2, 3, the digital drives 4, 5, 6 or other field and/or peripheral devices. The data network level 39 characterizes the connection between the levels 38 and 40 by means of the data network 1, and the process interface level 41 characterizes the reach-through of the automation components located at the level 40 to the underlying processes and/or process components. Thus, the input event 18 is, for example, the detection of actual transducer values in the case of drives, the detection, e.g. of actual values of the downstream-connected sensors in the case of decentralized input/output modules. The output event 32 is, e.g. the nominal-value output to the corresponding connected power sections in the case of drives, and, e.g. the nominal-value output to the corresponding connected actuators in the case of the decentralized input/output modules.

The operation shown in FIG. 2 characterizes the settled state of the communication system, i.e. all stations, especially the devices at automation component level 40, for example the decentralized input/output modules 2 and 3, are synchronized both to the communication clock of the data network 1 and to the relative clock 9 applicable throughout the system, and thus to the relative time 16. The stations are already synchronized to the communication clock used and to the relative clock 9 on system start-up.

The length of a communication cycle and thus, in particular, the length of the communication cycles m (34), m+1 (35), m+2 (36) and m+x (37) is therefore known to the individual stations of the communication system, particularly the decentralized input/output modules 2 and 3. The stations are synchronized to the communication clock used by means of the global control data packet 23 which in each case directly indicates the start of the next communication cycle and, therefore, is sent in time to all stations. This data packet 23 is evaluated by the stations during system start-up as a result of which the stations can synchronize to the communication clock of the communications system. To prevent overlap in the data transmission from one communication cycle to the next, and ensure precise evaluation of the data packet 23, and thus the definite signaling of the respective beginning of the communication cycle immediately following, no data are sent for a discrete time immediately before sending the global control data packet 23. This is called active waiting, indicated by the reserve 17. The reserve 17 is designated only once for the sake of clarity. During active operation, the global control data packet 23 always immediately indicates the start of the next communication cycle and is thus known to the stations of the communication system.

On the basis of the mechanism illustrated in FIG. 1, in which relative clock 9 is applicable throughout the system, the decentralized input/output module 2, for example, generates a stamp 20 by using the relative time 16 and which consists of the current relative time 16 belonging to an input event 18, and the type of the input event 18, for example positive or negative switching edge. The first part of the relative time 16 characterizes the current communication cycle, for example the communication cycle m (34) in which the decentralized input/output module 2 performs the signal detection 19 of an input event 18 of a device to be controlled at its input, and the second part defines the time of the signal detection 19 relative to the start or to the end within the current communication cycle, for example communication cycle m (34). Stamp 18 generated in this manner is added to the data at the automation component level 40, for example by the decentralized input/output module 2 during the signal detection 19 of the input event 18 or the signal conversion 21, so that the detection time and type of switching event data are accurately logged in the decentralized input/output module 2 and is a component of the data during forwarding. The stamp 20 is designated only once for reasons of simplicity. The data forwarding 22 at the data network level 39, indicated by the data packet 24, is then continued, for example at the beginning of the next communication cycle m+1 (35). The immediate start of the next communication cycle m+1 (35) is reported to all stations by transmitting the global control data packet 23. For reasons of efficiency the data packet 24, the global control data packet 23 marked grey (and reserve data packet 23) have only been designated once at the data network level 39. The different lengths of the data packets not designated have no special significance and only illustrate that the length of the individual data packets depends on content and is thus variable. Within the communication cycle m+1 (35), within communication cycle m+1 (35), the data transfer 25 of the forwarded data with stamp 20 now takes place from data network level 39 to control unit level 38, for example to the control unit 8 which performs the data processing 26. The control unit 8 evaluates both the stamp 20 and the content of the data. On the basis of this, the control unit 8 calculates response data and, based on the content of stamp 20, the required time for the future output of the response data to the corresponding device to be controlled, at the output, for example, of the decentralized input/output module 2, and the type of output event, for example positive or negative switching edge etc., with which it is intended to switch. Before being transmitted to the decentralized input/output module, the calculated response data which are intended for the device to be controlled are provided with a stamp 27, which consists of the calculated relative time referred to the required planned time of signal output and the output switching event, by the control unit 8 so that the stamp 27 is a component of the response data during the forwarding. The part of the stamp 27 which characterizes the relative time again consists of two parts. One part characterizes the communication cycle, for example communication cycle m+x (37) in which the decentralized input/output module 2 is to perform at its output the signal output 31 of an output event 32 to a device to be controlled, and the other part defines the output time of the signal output 31 relative to the start or to the end within this communication cycle thus determined, for example communication cycle m+x (37). The stamp 27 is designated only once for the sake of simplicity. From the control unit level 38, for example from control unit 8, the data transfer 28 of the calculated response data with the stamp 27 to the data network level 39 is effected, for example at the beginning of the next communication cycle m+2 (36). This data transfer 28 also occurs synchronously to the communication clock and can be performed in any communication cycle. From the data network level 39 a data transmission 29 is effected, for example still within communication cycle m+2 (36), to the automation component level 40, for example to the decentralized input/output module 2 which evaluates the stamp 27 with which the received data are provided. Depending on the result of the evaluation of the stamp 27, especially of the part which designates the time of the output of the data, the data are temporarily stored by the decentralized input/output module 2. The corresponding signal output 31, for example switching of nominal values at the output of the decentralized input/output module 2, with the switching event provided in the stamp 27 to the device to be controlled with the output event 32, is only effected at the intended time with the corresponding relative time 16, for example in communication cycle m+x (37). The data conversion 30 of the received data into signals which can be interpreted for the device to be controlled, which was previously necessary, can be carried out at any time between the data transmission 29 in the communication cycle m+2 (36) and the signal output 31 in communication cycle m+x (37) by the decentralized input/output module 2.

Thus, the switching of an output event 32 at the output of the decentralized input/output module can be planned precisely and performed with extraordinary precise timing based on the time of registration of an entry event 18 occurring at the input of a decentralized input/output module by using a relative clock 9 which is applicable throughout the system. This capability is extraordinarily advantageous in the field of drive engineering in distributed automation systems, for example for switching cams etc. The time interval 33 between input event 18 and output event 32 can thus be adjusted and achieved individually in each case with the same time accuracy for any situation in the field of application described which thereby greatly reduces the dependence on dead times by stations affected in the communication system. Moreover, it possible to implement applicative event sequences which are of eminent significance especially in the case of wood processing machines, for example in the production of furniture boards. Here, units for applying or cutting off edge bands must be switched with high precision of timing, depending, for example, on the detection of front or rear edges of wood.

In summary, the invention relates to a synchronous, clocked communication system, for example a distributed automation system, the stations of which can be arbitrary automation components and are coupled to one another via a data network[1] for the purpose of mutual data exchange. In this arrangement, all possible bus systems such as, e.g. field bus, professional field bus, Ethernet, industrial Ethernet etc. are conceivable as the data network[1] of the communication system. One station of this communication system is designated as timing generator and ensures the distribution and maintenance of the communication clock used to all stations and by all stations. The timing generator can also introduce a relative clock[9] in the entire communication system at all stations via the same mechanism. This station is thus also the master of the relative clock⁹ or, respectively, the applicable relative time 16. All stations of the communication system are, therefore, continuously synchronized to the relative clock⁹, which is applicable throughout this system, with the valid relative time 16 and, therefore have the same understanding of time at any time. This distinctly improves or even makes possible, respectively, the implementation of applicative sequences, synchronization of events occurring simultaneously, accuracy in time during the detection of events or, respectively, switching of outputs.

We claim:

1. A method for configuring a synchronous, clocked communication system having a data network and at least two stations connected to said data network, said communication systems providing data exchange in equidistant communication cycles between at least two stations, said method comprising
a step in which an unambiguous relative clock is introduced into the communication system during a system start-up for determining relative time throughout the system said time consisting of two parts, wherein the first part is the current communication cycle having a duration and the second part determines the time within the current communication cycle of the communication system and
a step in which stations are synchronized to the relative time determined by the relative clock, the relative time being transmitted to all stations via the data network.

2. The method according to claim 1, in a system having at least one control unit, at least one unit to be controlled, and at least one decentralized input/output module interfaced between the data network and the unit to be controlled, which are connected to the data network as stations of the communication system, further comprising at least one input/output module to bidirectionally exchange signals between the unit to be controlled and the control unit by means of the data network.

3. The method according to claim 2, wherein the communication cycle is represented by a digitized number or an absolute time unit which is derived from the duration of the communication cycle.

4. The method according to claim 2, wherein the accuracy of the relative clock is adjusted within a range between the duration of a communication clock cycle and 1 µs.

5. The method according to claim 1, wherein the unambiguous relative clock is applicable throughout the system, and the relative time remains valid for all stations until the system is shut down.

6. The method according to claim 1, wherein all stations remain synchronized to the unambiguous relative clock and to the relative time until the system is shut down.

7. The method according to claim 2, wherein the duration of the communication clock cycle is adjustable.

8. The method according to claim 7, wherein the duration of a communication clock cycle is between 10 µs and 10 ms.

9. The method according to claim 2 wherein the duration of a communication clock cycle is specified at least once during system start-up.

10. The method according to claim 2, further comprising
a step in which the signals registered in the input/output module are provided with a stamp comprising the relative time and a detection switching event;
a step in which said signals are converted into a data format compatible with the data network;
a step in which the data is forwarded with the stamp via the data network to the control unit where it is evaluated and processed; and
a step in which the relative time has two parts, the first part determining the communication cycle of the communication system during which the registration and signal detection has taken place, and the second part determining the time relative to the start or to the end of the communication cycle of the communication system in which the registration and signal detection has taken place.

11. The method according to claim 2, wherein the data intended for the device to be controlled are provided by the control unit with a stamp before transmission to the decentralized input/output module the stamp being composed of a relative time referenced to the time of a planned signal output and an output switching event, and the data with this stamp are transmitted to the input/output module via the data network, the relative time, as part of the stamp, consisting of two parts, one part determining the communication cycle of the communication system in which the signal output is to take place and the other part determining the time relative to the start or to the end of the communication cycle of the communication system in which the signal output is to take place.

12. The method according to claim 11, wherein data provided with a stamp which relates to the planned signal output and are intended for the device to be controlled are converted by the decentralized input/output module into signals which can be interpreted for the device to be controlled and are switched in accordance with a predetermined switching event at the output of the decentralized input/output module at a time which is predetermined by the transmitted stamp, and are output to the device to be controlled.

13. The method according to claim 2, wherein signals to a device to be controlled are switched or forwarded at the output of a decentralized input/output module in a defined dependence, which is adjustable in time, relative to the time of the registration and detection of signals of a device to be controlled at the input of a decentralized input/output module.

14. The method according to claim 1, wherein data are stored by one or more stations of the communication system until the system is shut down, said data being stored with the respective current relative time of the system, and wherein a joint evaluation and/or representation of the data thus recorded takes place on the basis of the respective stored relative time of the system.

15. The method according to claim 1, wherein at least one station of the communication system is an automation component which provides characteristic data which can be called up and evaluated by at least one control unit via the data network, the characteristic data containing at least the support of the relative clock and the possible adjustable accuracy, and the support of at least one mechanism which is derived from the use of a relative clock in a communication system.

16. The method according to claim 1, wherein one or more stations of the communication system are automation components which can perform detection of events within certain operating phases and/or at particular times on the basis of the relative clock.

17. A synchronous, clocked communication system having characteristics of equidistance in the field of industrial systems between at least two connected stations and at least one data network, comprising at least one means for introducing an unambiguous relative clock, integrated throughout the system and during system start-up, which clock synchronizes selected stations at least once to a relative time determined by the relative clock, the relative time being transmitted to all stations via the data network.

18. The communication system according to claim 17, wherein the stations include at least one control unit, at least one device to be controlled and at least one decentralized input/output module which, as interface between the data network and the device to be controlled, bidirectionally exchanges signals between the device to be controlled and the control unit by means of the data network.

19. The communication system according to claim 17, wherein the communication cycle is represented by a digitized number or an absolute time unit which is derived from the duration of the communication cycle.

20. The communication system according to claim 17, wherein the accuracy of the relative clock is adjusted within a range between the duration of one communication clock cycle and 1 µs.

21. The communication system according to claim 17, wherein the unambiguous relative clock and the relative time remain valid for all stations until the system is shut down.

22. The communication system according to claim 17, wherein all stations are synchronized to the unambiguous relative clock and to the relative time until the system is shut down.

23. The communication system according to claim 17, wherein the duration of the communication clock cycle is adjustable.

24. The communication system according to claim 23, wherein the duration of the communication clock cycle is adjusted between 10 µs and 10 ms.

25. The communication system according to claim 17, wherein the duration of a communication clock cycle is specified by the system at least once during the system start-up.

26. The communication system according to claim 18, wherein at least one decentralized input/output module provides the signals of a device to be controlled when they are registered and detected at the input of the decentralized input/output module with a stamp which is composed of the relative time which is current and a detection switching event, and wherein the signals are converted into a data format compatible for the data network, the data are forwarded with the stamp via the data network to the control unit where they are evaluated and processed, the relative time, as part of the stamp, consisting of two parts, one part determining the communication cycle of the communication system in which the registration and signal detection has taken place and the other part determining the time relative to the start or to the end of the communication cycle of the communication system in which the registration and signal detection has taken place.

27. The communication system according to claim 18, wherein at least one control unit provides data which are intended for the device to be controlled with a stamp before transmission to the decentralized input/output module, said stamp being composed of a relative time referenced to the time of a planned signal output and an output switching event, and the data with the stamp are transmitted to the decentralized input/output module via the data network, the relative time, as part of the stamp, consisting of two parts, one part determining the communication cycle of the communication system in which the signal output is to take place and the other part determining the time relative to the start or to the end of the communication cycle of the communication system in which the signal output is to take place.

28. The communication system according to claim 27, wherein at least one decentralized input/output module which converts data, which are provided with a stamp relating to the planned signal output intended for the device to be controlled, into signals which can be interpreted for the device to be controlled and switches them in accordance with a predetermined switching event at the output of the decentralized input/output module at the time predetermined by the transmitted stamp and outputs them to the device to be controlled.

29. The communication system according to claim 18, wherein the signals to a device to be controlled are switched and forwarded at the output of a decentralized input/output module in a defined dependence, which is adjustable in time, relative to the time of the registration and detection of signals of a device to be controlled at the input of a decentralized input/output module.

30. The communication system according to claim 17, wherein data are by one or more stations of the communication system until the system is shut down, said data being stored together with the respective current relative time of the system for joint evaluation and/or representation on the basis of the respective stored relative time of the system.

31. The communication system according to claim 17, wherein at least one station is an automation component, which supports the relative clock and which provides characteristic data which can be called up and evaluated by at least one control unit via the data network, the characteristic data containing at least the support of the relative clock and the possible adjustable accuracy, and at least one possibility of adjusting the relative clock and the support of at least one mechanism which is derived from the use of a relative clock in a communication system.

32. The communication system according to claim 17, wherein at least one station is an automation component, which can only perform a detection of events in certain operating phases and/or at particular times on the basis of the relative clock.

* * * * *